United States Patent
Feltham et al.

(10) Patent No.: US 10,146,397 B2
(45) Date of Patent: Dec. 4, 2018

(54) USER EXPERIENCE STEERING

(71) Applicant: International Business Machines Corporation, Armonk, NY (US)

(72) Inventors: Andrew S. Feltham, Chandlers Ford (GB); James K. Hook, Eastleigh (GB); Hamish C. Hunt, Middlesex (GB); Nicholas K. Lincoln, Middle Wallop (GB)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 14/953,225

(22) Filed: Nov. 27, 2015

(65) Prior Publication Data
US 2017/0153784 A1 Jun. 1, 2017

(51) Int. Cl.
*G06F 3/048* (2013.01)
*G06F 3/0481* (2013.01)
*G06F 9/451* (2018.01)

(52) U.S. Cl.
CPC .......... *G06F 3/04812* (2013.01); *G06F 9/451* (2018.02)

(58) Field of Classification Search
CPC ..... G06F 3/04812; G06F 9/4443; G06F 9/451
USPC ......................................... 715/702, 856–862
See application file for complete search history.

(56) References Cited

U.S. PATENT DOCUMENTS 5,963,191 A   10/1999  Jaaskelainen
8,717,298 B2   5/2014  Nash
2009/0015550 A1*  1/2009  Koski ................. G06F 3/04812
                                                345/157
2013/0080890 A1*  3/2013  Krishnamurthi ...... G06F 9/4443
                                                715/702
2013/0201178 A1   8/2013  De Mers
2013/0219272 A1   8/2013  Balasubramanian
2014/0006944 A1   1/2014  Selig
2015/0185995 A1   7/2015  Shoemaker

FOREIGN PATENT DOCUMENTS

DE        69736552 T2    5/2007

OTHER PUBLICATIONS

SteerMouse, downloaded Sep. 3, 2015, http://plentycom.jp/en/steermouse/.
Hanna, P, IBM Technical Disclosure Bulletin, "Method for Simplifying the Accurate Positioning of a Mouse Pointer," vol. 36, No. 04, Apr. 1993, pp. 339-341.

* cited by examiner

*Primary Examiner* — Andrey Belousov
(74) *Attorney, Agent, or Firm* — Anthony V. S. England; Nicholas Bowman

(57) ABSTRACT

This invention relates to a system, method and computer program product for a graphic user interface (GUI) comprising: a GUI controller for controlling a GUI; a graphical cursor engine for projecting a mouse cursor on to a GUI and responsive to a user moving and controlling a mouse to select the graphical controls; a user action recorder for recording sequences of user actions in the GUI in a database of user sequences for a plurality of GUI user sessions; a next action engine for determining, in a particular GUI user session, a next action with the highest probability for a particular GUI based on one or more recorded sequences for that GUI in the database of user sequences and user past actions in that session; and a biasing engine for biasing graphical cursor movement towards the next action with the highest probability.

20 Claims, 7 Drawing Sheets

USER EXPERIENCE STEERING

BACKGROUND

The present invention relates to a method and apparatus for steering user experience in a graphic user interface.

Software application graphical user interfaces have a seemingly growing number of buttons, controls and areas that can be clicked on.

SUMMARY

In an aspect of the invention there is provided a method in a graphic user interface having a graphical cursor comprising: recording sequences of user actions in the graphical user interface (GUI) in a database of user sequences for a plurality of GUI user sessions; determining, for a particular GUI, a highest probability next action for a particular GUI based on one or more recorded sequences for that GUI in the database of user sequences and user past actions in that session, the highest probability next action having a graphical control in the GUI; and biasing graphical cursor movement towards the graphical control of the highest probability next action.

In another aspect of the invention there is provided a graphic user interface (GUI) biasing system comprising: a graphical user interface (GUI) controller for controlling a GUI; a graphical cursor engine for projecting a mouse cursor on to a GUI and responsive to a user moving and controlling a mouse to select the graphical controls; a user action recorder for recording sequences of user actions in the GUI in a database of user sequences for a plurality of GUI user sessions; a next action engine for determining, in a particular GUI user session, a next action with the highest probability for a particular GUI based on one or more recorded sequences for that GUI in the database of user sequences and user past actions in that session, the highest probability next action having a graphical control in the GUI; and a biasing engine for biasing graphical cursor movement towards the graphical control of the next action with the highest probability.

In a further aspect of the invention there is provided a computer program product for a graphic user interface, the computer program product comprising a computer readable storage medium having program instructions embodied therewith, the program instructions executable by a processor to cause the processor to: record sequences of user actions in the graphical user interface (GUI) in a database of user sequences for a plurality of GUI user sessions; determine, for a particular GUI, a highest probability next action for a particular GUI based on one or more recorded sequences for that GUI in the database of user sequences and user past actions in that session, the highest probability next action having a graphical control in the GUI; and bias graphical cursor movement towards the graphical control of the highest probability next action.

BRIEF DESCRIPTION OF THE DRAWINGS

Preferred embodiments of the present invention will now be described, by way of example only, with reference to the following drawings in which.

DETAILED DESCRIPTION

Too many clickable areas in a graphical user interface can have a negative impact on clicking in the right places and yet in the majority of the cases too many clickable areas are permanently available to click on. The more cluttered the screen, the more chance there is of a user moving the mouse too quickly and accidentally going past the icon that they want or possibly even clicking on the wrong control. In known operating system graphical interfaces, the operating system menu has the ability to dynamically re-order and hide icons representing the most recently used applications. Technology is herein disclosed to assist the user in finding the correct item if the wanted icon is hidden.

Figure 1:
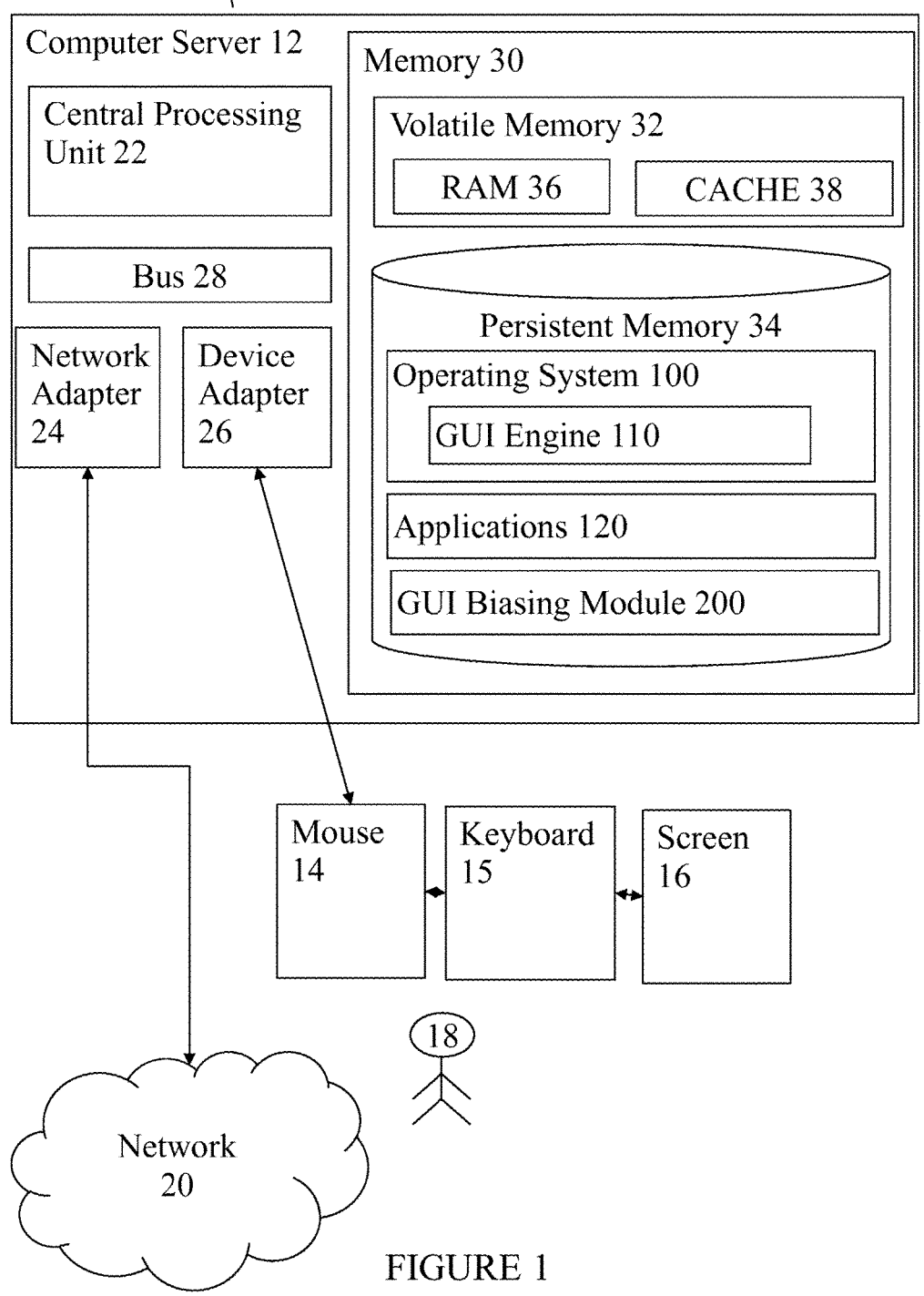
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems.

Computer processing system 10 may be described in the general context of computer system executable instructions, such as program modules, being executed by a computer processor. Generally, program modules may include: routines; programs; objects; components; logic; and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general purpose computer server 12; mouse 14; keyboard 15; and screen 16. Computer processing system 10 is connected to a network 20. Computer processing system 10 communicates with a user 18 using mouse 14, keyboard 15 and screen 16. Other input devices may be used in other embodiments including a trackball or another pointing device. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 enables communication between computer server 12 and mouse 14, keyboard 15 and screen 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media.

The set of program modules configured to carry out the functions of the preferred embodiment comprises: operating system module 100; applications 120; and GUI biasing module 200. In one embodiment, ROM in the memory 30 stores these modules to enable the computer server 12 to function as a special purpose computer. Further program modules that support the preferred embodiment but are not shown include firmware, boot strap program, and applications. Each of the operating system; support applications; other program modules; and program data; or some combination thereof; may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Operating system module 100 is for loading and executing one or more applications 120. Operating system module 100 comprises a GUI engine 110 for performing graphical user interactions in windows with graphical controls. Operating system module 100 comprises a myriad of other functions that are not described here.

Applications 120 are for providing services to a user and will make operating system calls to the GUI engine 110 to provide the desired user interface.

GUI biasing module 200 provides the main logical control for the preferred embodiment.

Figure 2:
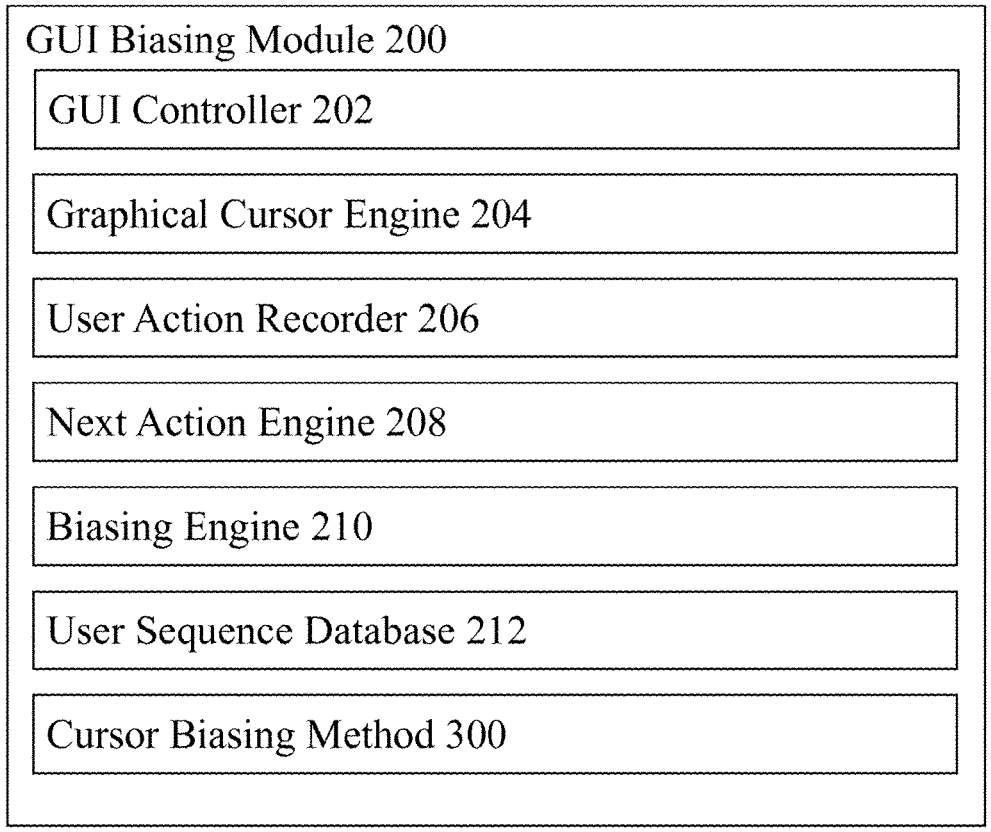
FIG. 2 is a component diagram of the preferred embodiment.

Referring to FIG. 2, GUI biasing module 200 comprises the following components: a GUI controller 202; a graphical cursor engine 204; a user action recorder 206; next action engine 208; a biasing engine 210; a user sequence database 212; and a cursor biasing method 300.

GUI controller 202 is for interacting with operating system GUI engine 110 as required by the cursor biasing method 300. For example, GUI controller 202 can request co-ordinates in GUI space of GUI controls and the cursor.

Graphical cursor engine 204 is for controlling the position of the cursor in the GUI and for updating the cursor position in response to user mouse movement and also changes in cursor speed as controlled by the cursor biasing method 300. This function is already performed by GUI engine 110 but graphical cursor engine 204 provides an extra layer of control for the embodiments. In the preferred embodiment the graphical cursor engine 204 is for changing the dots per inch (DPI) setting for the mouse cursor to vary the amount of mouse movement needed for corresponding cursor movement; this feature biases the movement of the cursor towards the highest probability next action by slowing the cursor when moving away from the highest probability next action and speeding the cursor up when moving towards the highest probability next action. In other embodiments, the GUI controller 202 breaks the movement of the cursor into a component of movement towards the next action and a component of movement perpendicular to the next action; movement along two components directions is encouraged (by speeding up) and discouraged (by slowing up).

User action recorder 206 is for recording sequences of user actions in the GUI in the user sequence database 212 for a plurality of GUI user sessions. The database will also record the number of times that a sequence is used by a user whereby the more times a user has chosen a particular sequence then the more chance it will get chosen again.

Next action engine 208 is for determining, in a particular GUI user session, a next action with the highest probability for a particular GUI based on one or more recorded sequences for that GUI in the user action sequence database 212 and user past actions in that session. A simple sequence matching approach is taken in the preferred embodiment; if a user has a single recorded sequence then it determines that the user will use this sequence 100%. If there are two sequences with a 50% chance then a pseudo-random choice is made. If there are two sequences and the first sequence has been used twice as much as a second sequence then the first sequence will have a higher probability of containing the next action with 66% versus 33%. Other embodiments can use more complex next action determination such as Hidden Markov modeling as used for recognizing a probable phoneme sequence from a large base of different phoneme sequences.

Biasing engine 210 is for biasing graphical cursor movement towards the next action with the highest probability. In the preferred embodiment the biasing engine creates a closed virtual cursor wall around the cursor and highest probability next action location that biases the cursor from leaving the vicinity of the highest probability next action location. In the preferred embodiment the closed virtual wall changes its shape to follow the cursor movement so further biasing the cursor movement from going backwards. In an alternative embodiment the biasing engine creates a virtual three dimension landscape of hills to bias the cursor from moving away from the next action location and wells to bias the cursor towards the next action location.

In the preferred embodiment, biasing engine 210 comprises the logical process steps to create a wall around the cursor to bias the cursor within the confines of the wall, the steps comprising: building a block outline of the GUI interface including the highest probability next action GUI control, other lower probability GUI controls and the cursor position; creating a wall by tracing a path around the highest probability next action and cursor but excluding all the other GUI controls. In the preferred embodiment the graphical cursor engine 204 reduces the dots per inch (DPI) of the cursor when the cursor attempts to cross the wall; after the cursor crosses a wall or if the cursor moves back from the wall then the DPI setting is restored. In the preferred embodiment graphical cursor engine 204 continuously listens for cursor wall impact and periodically calls biasing engine 210 to update the wall outline.

In the alternative embodiment, biasing engine 210 comprises logical steps to create a hill and valley landscape whereby the cursor is biased to travel into a well and not to go up a hill, said logical steps comprising: modeling a well for the highest probable next step graphical control; modeling hills for graphical controls that are not the highest probable next step; and smoothing the landscape so that the area is continuous. In the alternative embodiment the graphical cursor engine 204 changes the dots per inch (DPI) of the cursor according to the gradient of the landscape and the direction of travel. In the alternative embodiment graphical cursor engine 204 continuously listens for changes in gradient and direction to make changes in DPI.

User sequence database 212 is for storing user sequences as they collected from use actions irrespective and especially when the sequence does not follow sequences that are already stored.

Cursor biasing method 300 is for controlling the components of the GUI biasing module to perform the preferred embodiment.

Figure 3:
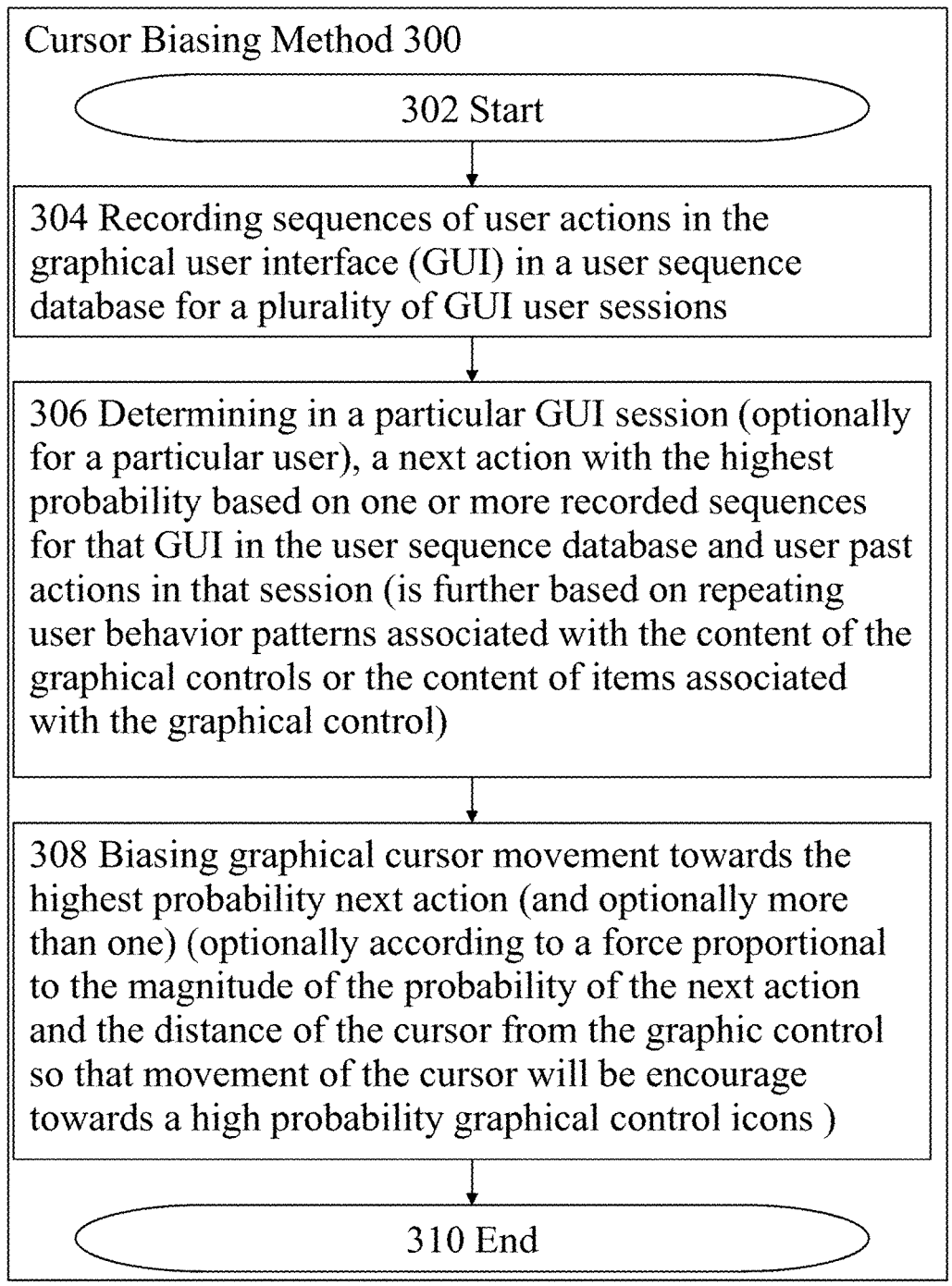
FIG. 3 is a flow diagram of a process of the preferred embodiment.

Referring to FIG. 3, cursor biasing method 300 comprises logical process steps 302 to 310. Although there is an order to the preferred embodiment steps as described, the steps may not necessarily need to be in this order unless specified and in other embodiments steps can be in a different order.

Step 302 is the start of cursor biasing method 300 as initiated when a user starts to traverse a GUI and the GUI biasing module 200 is enabled.

Step 304 is for recording sequences of user actions in the graphical user interface (GUI) in a database of user sequences for a plurality of GUI user sessions. Typically these are actions performed on graphical controls where each graphical control occupies space in the GUI.

Step 306 is for determining, for a particular GUI, a highest probability next action based on one or more recorded sequences for that GUI in the database of user sequences and user past actions in that session. In the preferred embodiment, step 306 is also for determining a next action with the highest probability in a particular GUI user session. However, embodiments are envisaged where the average next action of all users for a particular GUI is considered.

Over time, the next action selection behaviors of a user are built up when using different application GUIs. Together with the history of the present session the embodiments are able to understand a set of possible/probable next actions for any given state. Once a next action has been identified in a GUI then the embodiments guide the cursor movements to a particular target by applying subtle bias.

Application relationships are understood for a given user. At an operating system level, the applications that a user opens are recorded. These are recorded against a user profile such that it could be understood the characteristics of usage. For example, the time of day certain applications are opened, related applications (that is always opening one and then another), or frequency and duration of use.

User actions are recorded for each application. Over time the way a user interacts with an application is gathered. These statistics do not affect the GUI the user sees but instead builds a profile of the way the user typically interacts with the application. This creates a personal profile. For example, after selecting or typing a signature in an email GUI, the user moves the mouse to the 'send' button; messages with a certain subject are always opened first; messages that contain unsubscribe are typically deleted using the delete icon, but on occasion the link to unsubscribe is also clicked.

In the preferred embodiment calculating a probability for a next action is based on repeating user behavior patterns associated with the content of the graphical controls or the content of items associated with the graphical control. The preferred embodiment envisages that a user may exhibit repeating behavioral patterns associated with the label of the graphical control not just the button associated by its position in the GUI.

Step 308 is for biasing graphical cursor movement towards the highest probability next action. In the preferred embodiment biasing graphical cursor movement comprises creating a cursor boundary around the highest probability next action and the cursor whereby the cursor is biased against crossing the cursor boundary. The cursor boundary is updated to shrink to contain the cursor as the cursor moves closer to the highest probability next action. The preferred embodiment considers a single next action.

In an alternative embodiment, step 308 comprises biasing graphical cursor movement towards more than one high probability next actions. In this embodiment biasing graphical cursor movement is according to a force proportional to the magnitude of the probability of the next action and the distance of the cursor from the graphic control so that movement of the cursor will be encourage towards a high probability graphical control. One way of simulating a force on cursor movement is to create virtual hills in cursor movement space.

The preferred embodiment is envisaged with virtual hills superimposed on virtual cursor movement space that bias the cursor against climbing up a hill. Each hill is designed to catch cursor movement and make it difficult (but not impossible) to get past. In doing so the user is able to move quickly to the general area of the next action at which point the mouse pointer will come up against a hill and at this point the mouse will be slowed down in order to guide them to the particular target.

Furthermore in this alternate embodiment biasing of GUI cursor movement towards probable graphic controls is further accomplished by creating virtual wells in cursor movement space. The alternative embodiment also uses virtual wells superimposed on cursor movement space that makes motion in a particular direction easier to perform. Other embodiments may use only wells. Each well is designed to attract the mouse such that motion away from the point of attraction is difficult (but not impossible). This would result in mouse motion towards a particular location being accelerated and is conceptually similar to gravitational wells but in a UI context.

Normally flat cursor movement space is interrupted with different levels associated with higher probability positions in the space. A contoured cursor movement space is achieved through smoothing of all the higher probability positions.

The most probable next action for a user is constantly reviewed as the application is used. Initially the user and application candidates for probable next actions will be small or zero however over time with recording of user actions the number of candidates will grow.

Step 310 is the end of cursor biasing method 300 when the user has selected the most probable user action or not. In either case, the sequence of next action is recorded in the database for improving on the most probably next action determination.

Referring to FIGS. 4A, 4B, 4C and 4D, different states of an example email GUI 400 of an email client application of the preferred embodiment are described. Email GUI 400 comprises the following graphical controls: window control 402; application toolbar 404; addressee field 406; subject field 408; and text field 410. Window control 402 provides for minimizing (−); maximizing ([ ]) and closing (X) of the email GUI 400. Application toolbar 404 provides the following controls: send button 404.2; save button 404.4; and signature button 404.6. Send button 404.2 is a control for sending the message written in email GUI 400. Save button 404.4 is a control for saving the message as a draft. Signature button 404.6 is for inserting a signature in the message text field box 410.

Figure 4A:
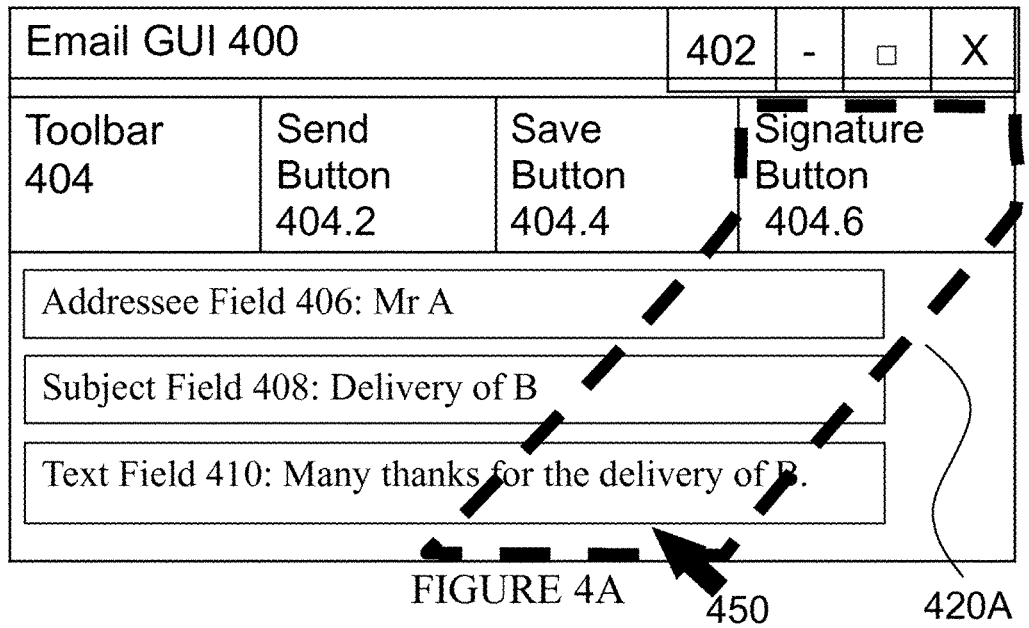
FIG. 4A to 4D are example screen shots of an example of the preferred embodiment.

Referring to FIG. 4A email GUI 400 is in a state where the user is writing a message. The preferred embodiment assesses that the most probable next action for the user to add a signature by pressing signature button 404.6. Given the position of cursor 450 then a wall 450 (as represented by a thick virtual dashed line) is traced around signature button 404.6 and cursor 450 to and guide cursor movement towards 404.6. In this embodiment the wall is a type of hill that the cursor can cross but only with extra mouse movement. This thick dashed line does not need to be represented visually on the GUI screen and can remain invisible except for the effect that it has on cursor movement. If the user moves the cursor towards the wall then the wall will take energy out of this component of movement and encourage the movement towards signature button 404.6. If the user overcomes the bias to select another button (say the save button 404.4) then this action would be recorded as a new recorded sequence or another instance of a recorded sequence that has occurred again. In other embodiments and in the embodiment of FIG. 5A to 5D the walls are more hill like and smoothed over like contours on the GUI.

Hills, wells, walls, trenches and force fields are just some of the ways to embody the biasing of the cursor movement towards the most probably next action on the GUI.

Figure 4B:
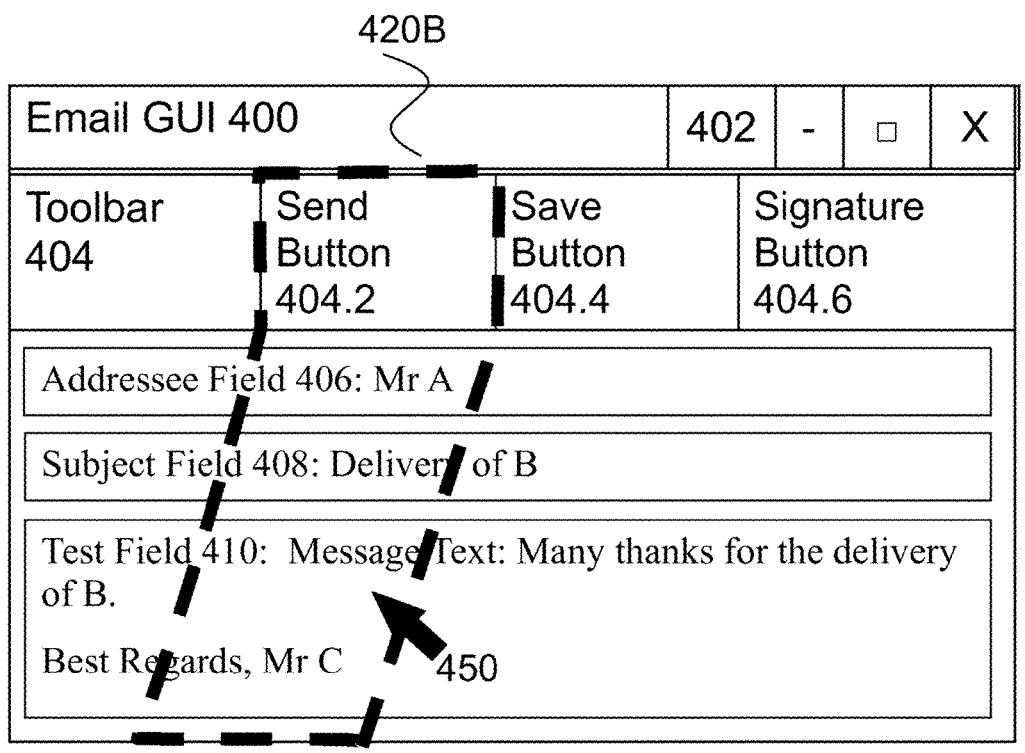

Referring to FIG. 4B, the user has actioned signature button 404.6 and the embodiment has calculated that next highest probability next action is send button 404.2. A new wall 420B is traced around send button 404.2 and cursor 450 to encourage cursor movement from the bottom of the GUI towards this button.

The preferred embodiment tracks the current location of the cursor and continuously adjusts a wall that bounds the graphic control and the mouse cursor. The location of the mouse cursor will indicate which of the sides of the next action graphic control are to be bounded and which sides left open.

As the mouse moves, the walls are updated. During typical operation the user may change the location of the mouse pointer from one side of the screen to the other. Based on this change the walls created on the screen are adjusted such that they continue to 'face' the mouse cursor. In the following figures, the cursor location has changed but the likely next action is still the same. As a result the walls are updated to reflect the new cursor location.

Figure 4C:
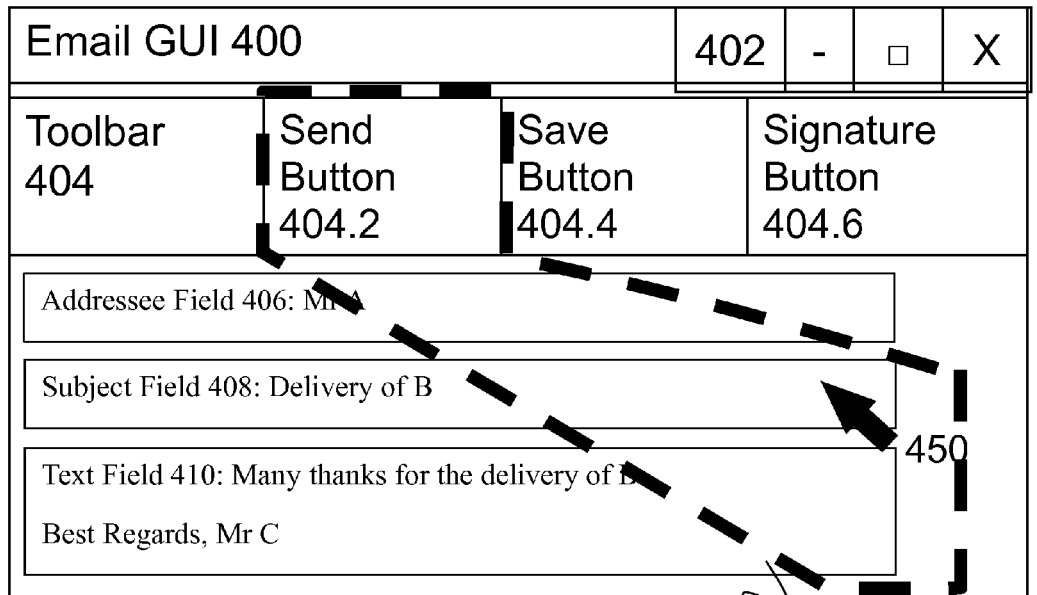

Referring to FIG. 4C, the user has moved the cursor to the right hand side of the screen and the position of the wall is updated. A new wall 420C is positioned around send button 404.2 to encourage cursor 450C movement from the right hand side of the screen towards send button 404.2.

Figure 4D:
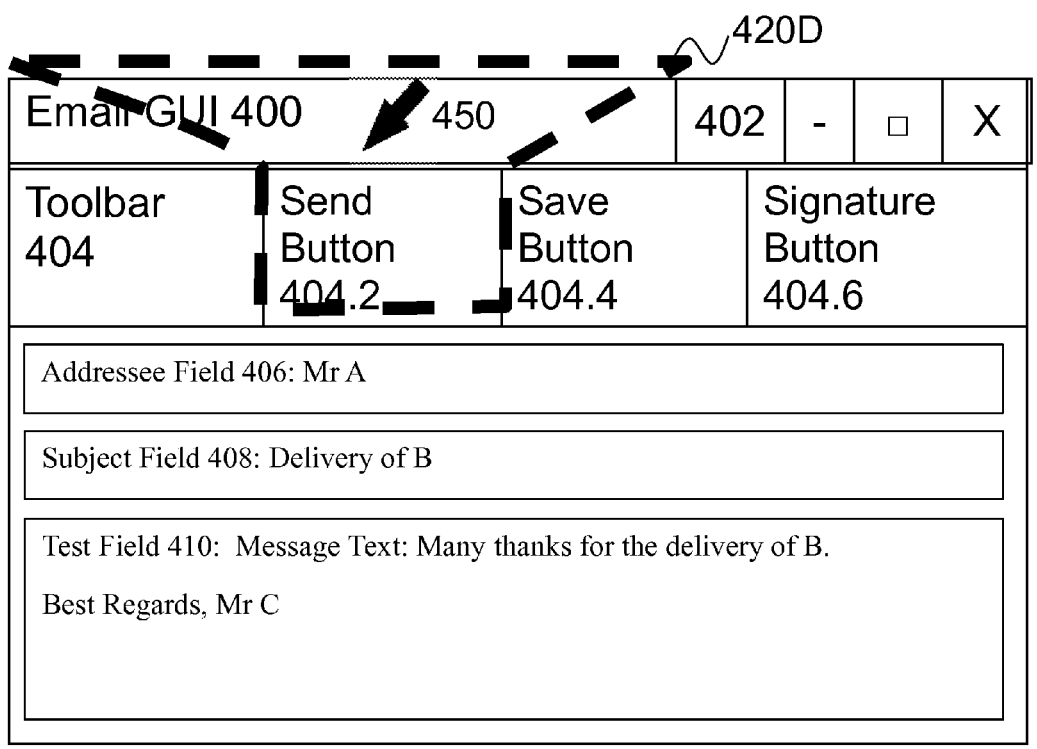

Referring to FIG. 4D, the user has moved the cursor 450 to the top of the screen and the position of the hill is updated. A new wall 420D is positioned around send button 404.2 to encourage cursor 450 to move from the top of the screen towards send button 404.2.

In one embodiment where the wall is more of a hill then gradient of the wall/hill can expressed by a simple formula such as grad=rho/(r^2), where rho is a constant and r is the distance from a pre-computed line, as indicated in the diagram above. As r tends towards zero (the line is approached), then the hill gradient increases to an infinite height to completely stop cursor movement over the wall. However, in the preferred embodiment the wall height has a defined maximum then requires some extra mouse movement to overcome.

As the user moves the mouse to try and click on a target the cursor enters one of the virtual hills created in the steps before.

Some embodiments will bias the mouse cursor by adding a height dimension to two dimensional mouse movement space so that there are in effect extra pixels to move over. Other embodiments can vary the dots per inch (DPI) of the mouse such that it has the effect of slowing the mouse cursor down as it goes up a hill. In all cases, if the user wants to move past the hill they can do simply by moving the mouse the required distance to get over the hill.

Referring to FIGS. 5A, 5B, 5C and 5D an alternative embodiment uses hill and or wells to create a more contoured and smooth biasing of the mouse cursor towards next action graphical controls and away from graphical controls that are less probable. Just as a hill steers a mouse cursor away from a point or region, a well steers a user towards a point or region. In other embodiments, hills and wells can be used separately.

Figure 5A:
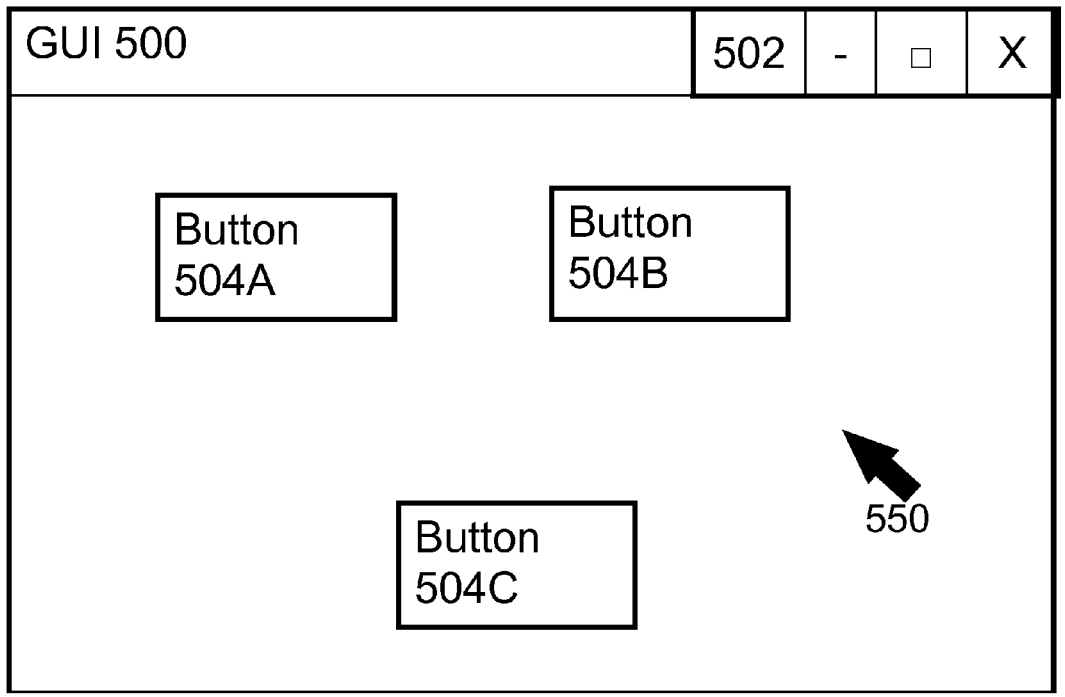
FIG. 5A to 5D are example screen shots of an example of an alternative embodiment.

Referring to FIG. 5A, a formation of buttons 504A, 504B and 504C are shown as they would appear on a GUI. The most probable sequence comprises: button 504A; button 504B; and button 504C because that is the only sequence in the example database.

Figure 5B:
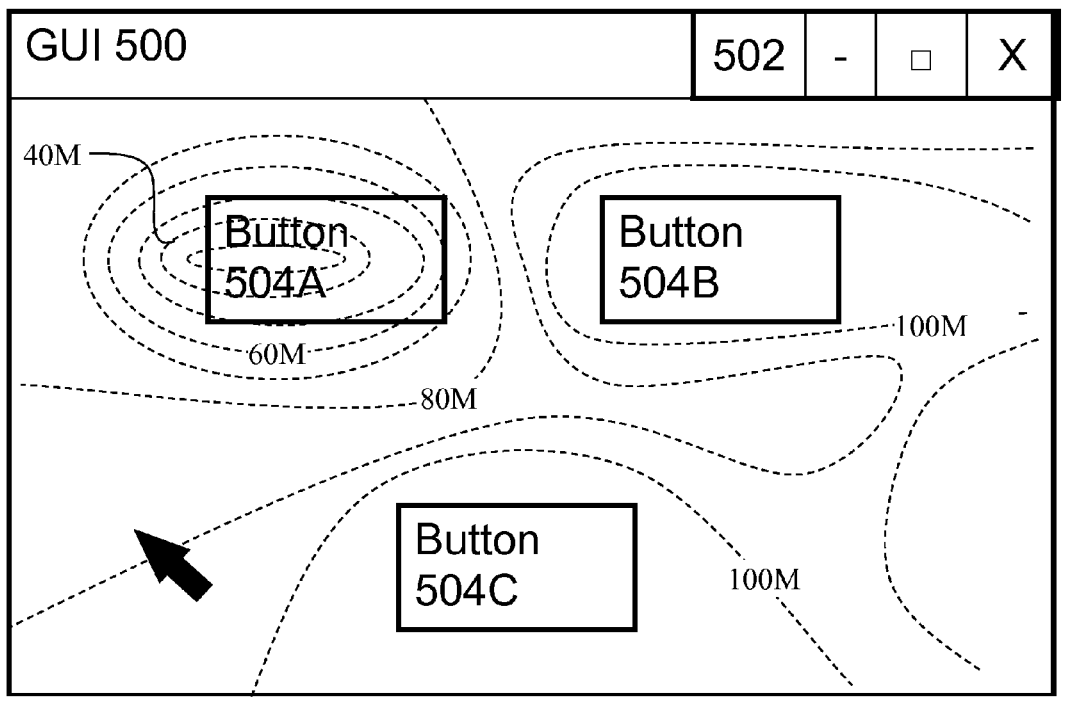

Referring to FIG. 5B, contour lines have been virtually superimposed onto the GUI showing that button 504A exists in a well (a series of concentric contour lines starting below 40M and ending above 60M). The actual unit of height is not important but the unit of M (meters) is used for illustrative purposes. Button 504A is the highest probable next action in a sequence and is shown biased for cursor movement and user selection. Buttons 504B and 504C are shown on plateaus above 100M so that the cursor will be biased towards button 504A.

Figure 5C:
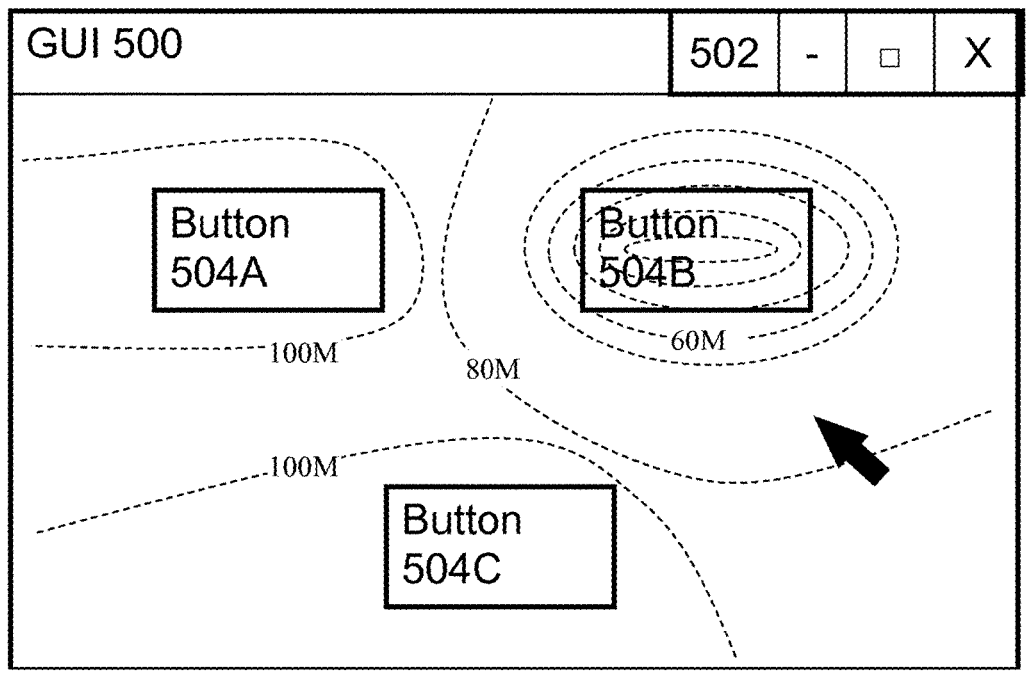

Referring to FIG. 5C, button 504A has been now been selected by the user and the highest probable next action is now button 504B in the sequence. Contour lines have been virtually superimposed onto the GUI showing that button 504B exists in a well and is biased for cursor movement and user selection. Buttons 504A and 504C are shown on plateaus above 100M so that the cursor will be biased towards button 504B.

Figure 5D:
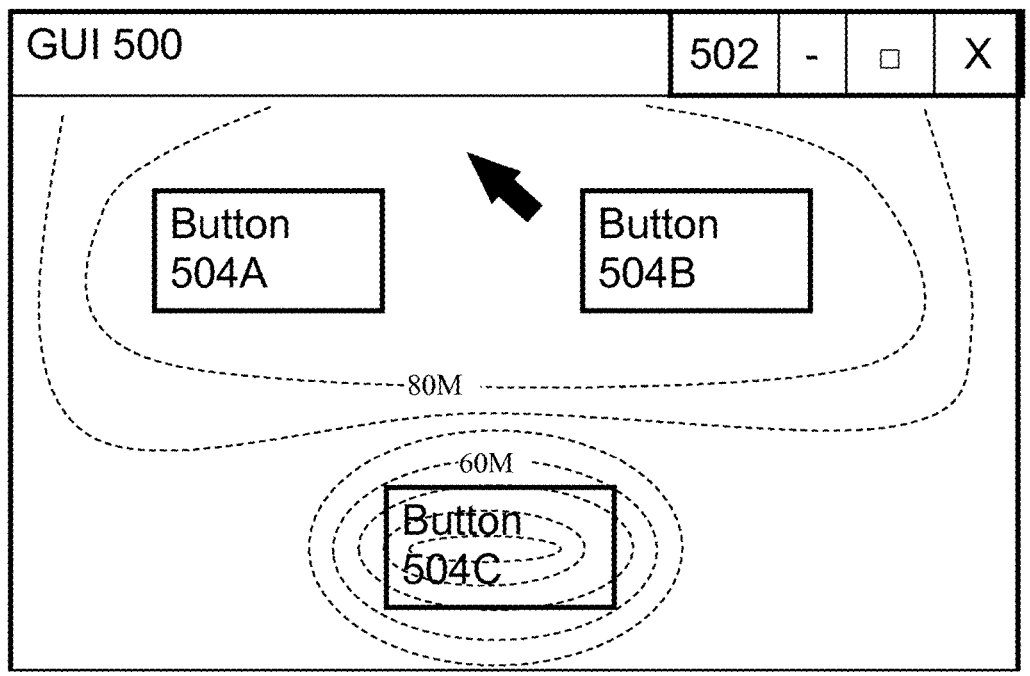

Referring to FIG. 5D, button 504B has now been selected by the user and the highest probable next action is button 504C in the sequence. Contour lines have been virtually superimposed onto the GUI showing that button 504C exists in a well and is biased for cursor movement and user selection. Buttons 504A and 504B are shown on plateaus above 100M so that the cursor will be biased towards button 504C.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The invention claimed is:

1. A method in a graphic user interface (GUI) of an application, the GUI having a graphical cursor, comprising:
   recording, in a database of user sequences for the application, sequences of user actions in the GUI of a plurality of users;
   determining a highest probability next action that is to be executed in the same application, where the determining is based on the recorded sequences of the plurality of users, the highest probability next action having a graphical control in the GUI; and
   biasing, in a current session of a current user of the application, graphical cursor movement towards the graphical control of the highest probability next action that is to be executed in the same application, wherein the biasing comprises:
   creating a cursor boundary around the cursor and the highest probability next action that is to be executed in the same application, wherein the cursor boundary is updated to shrink to contain the cursor and the highest probability next action that is to be executed in the same application responsive to distance of the cursor to the highest probability next action; and
   biasing the cursor against crossing the cursor boundary.

2. A method according to claim 1, where the determining the highest probability next action that is to be executed in the same application includes determining the highest probability next action of the current user of the application based on actions including actions of the current user during the current session of the application.

3. A method according to claim 1, where the determining the highest probability next action that is to be executed in the same application includes determining a plurality of highest probability next actions to be executed in the same application, the highest probability next actions having respective graphical controls in the GUI, and where the biasing the graphical cursor movement includes biasing the graphical cursor movement towards the graphical controls of the plurality of highest probability next actions in an amount that is responsive to movement of the cursor by the current user in the current session of the application.

4. A method according to claim 3, wherein the biasing the graphical cursor movement includes biasing according to a force proportional to magnitudes of probabilities of the plurality of highest probability next actions and the distance of the cursor from the graphic controls of the plurality of highest probability next actions, so that movement of the cursor will be encouraged towards the graphical controls of the plurality of highest probability next actions.

5. A method according to claim 1, wherein the biasing of the graphical cursor movement includes biasing away from graphic controls of lowest probability next actions responsive to virtual hills in cursor movement space.

6. A method according to claim 5, wherein the biasing of the graphical cursor movement includes biasing towards the graphic controls of the highest probability next actions responsive to virtual wells in cursor movement space.

7. A method according to claim 1, wherein the determining the highest probability next action that is to be executed in the same application includes determining the highest probability next action that is to be executed in the same application based on user behavior patterns associated with content of the graphical control or content of at least one item associated with the graphical control.

8. A method according to claim 1, wherein determining the highest probability next action that is to be executed in the same application includes determining the highest probability next action that is to be executed in the same application based on historical selection of the user actions.

9. A system for biasing in a graphic user interface (GUI) of an application, the system comprising:
   a GUI controller for controlling a GUI;
   a graphical cursor engine for projecting a mouse cursor on to a GUI and responsive to a user moving and controlling a mouse to select the graphical controls;
   a user action recorder for recording sequences of user actions in the GUI in a database of user sequences for a plurality of GUI user sessions;
   a next action engine for determining a highest probability next action that is to be executed in the same application, where the determining is based on the recorded sequences of the plurality of users, the highest probability next action having a graphical control in the GUI; and
   a biasing engine for biasing, in a current session of a current user of the application, graphical cursor movement towards the graphical control of the highest probability next action that is to be executed in the same application wherein the biasing comprises:

creating a cursor boundary around the cursor and the highest probability next action that is to be executed in the same application, wherein the cursor boundary is updated to shrink to contain the cursor and the highest probability next action that is to be executed in the same application responsive to distance of the cursor to the highest probability next action; and biasing the cursor against crossing the cursor boundary.

10. A system according to claim 9, where the determining the highest probability next action that is to be executed in the same application includes determining the highest probability next action of the current user of the application based on actions including actions of the current user during the current session of the application.

11. A system according to claim 9, where the determining the highest probability next action that is to be executed in the same application includes determining a plurality of highest probability next actions to be executed in the same application, the highest probability next actions having respective graphical controls in the GUI, and where the biasing the graphical cursor movement includes biasing the graphical cursor movement towards the graphical controls of the plurality of highest probability next actions in an amount that is responsive to movement of the cursor by the current user in the current session of the application.

12. A system according to claim 11, wherein the biasing the graphical cursor movement includes biasing according to a force proportional to magnitudes of probabilities of the plurality of highest probability next actions and the distance of the cursor from the graphic control of the plurality of highest probability next actions, so that movement of the cursor will be encouraged towards the graphical controls of the plurality of highest probability next actions.

13. A system according to claim 9, wherein the biasing of the graphical cursor movement includes biasing away from graphic controls of lowest probability next actions responsive to virtual hills in cursor movement space.

14. A system according to claim 13, wherein the biasing of the graphical cursor movement includes biasing towards the graphic controls of the highest probability next actions responsive to virtual wells in cursor movement space.

15. A system according to claim 9, wherein the determining the highest probability next action that is to be executed in the same application includes determining the highest probability next action that is to be executed in the same application based on user behavior patterns associated with content of the graphical control or content of at least one item associated with the graphical control.

16. A computer program product for biasing in a graphic user interface (GUI) in an application, the computer program product comprising a computer readable storage medium having program instructions embodied therewith, the program instructions executable by a processor to cause the processor to:

record, in a database of user sequences for the application, sequences of user actions in the GUI of a plurality of users;

determine a highest probability next action that is to be executed in the same application, where the determining is based on one the recorded sequences of the plurality of users, the highest probability next action having a graphical control in the GUI; and bias, in a current session of a current user of the application, graphical cursor movement towards the graphical control of highest probability next action that is to be executed in the same application wherein the biasing comprises:

creating a cursor boundary around the cursor and the highest probability next action that is to be executed in the same application, wherein the cursor boundary is updated to shrink to contain the cursor and the highest probability next action that is to be executed in the same application responsive to distance of the cursor to the highest probability next action; and biasing the cursor against crossing the cursor boundary.

17. A computer program product according to claim 16, where the determining the highest probability next action that is to be executed in the same application includes determining the highest probability next action of the current user of the application based on actions including actions of the current user during the current session of the application.

18. A computer program product according to claim 16, where the determining the highest probability next action that is to be executed in the same application includes determining a plurality of highest probability next actions to be executed in the same application, the highest probability next actions having respective graphical control of in the GUI, and where, the biasing the graphical cursor movement includes biasing the graphical cursor movement towards the graphical controls of the plurality of highest probability next actions in an amount that is responsive to movement of the cursor by the current user in the current session of the application.

19. A computer program product according to claim 16, wherein the biasing of the graphical cursor movement includes biasing away from graphic controls of lowest probability next actions responsive to virtual hills in cursor movement space.

20. A computer program product according to claim 16, wherein the determining the highest probability next action that is to be executed in the same application includes determining the highest probability next action that is to be executed in the same application based on user behavior patterns associated with content of the graphical control or content of at least one item associated with the graphical control.

* * * * *